United States Patent [19]

Miyauchi et al.

[11] Patent Number: 5,007,680
[45] Date of Patent: Apr. 16, 1991

[54] VEHICULAR SEAT WITH SEATBACK INCLINING MECHANISM

[75] Inventors: Fumio Miyauchi; Shyuzi Mizuno, both of Kanagawa, Japan

[73] Assignee: Ikeda Bussan Co., Ltd., Ayase, Japan

[21] Appl. No.: 417,491

[22] Filed: Oct. 5, 1989

[30] Foreign Application Priority Data

Oct. 28, 1988 [JP] Japan ............................ 63-140572[U]

[51] Int. Cl.⁵ ............................................. B60N 2/02
[52] U.S. Cl. ...................................... 297/379; 297/378
[58] Field of Search ................. 297/379, 378, 380, 382

[56] References Cited

U.S. PATENT DOCUMENTS

| | | | |
|---|---|---|---|
| 3,123,401 | 3/1964 | Komenda | 297/379 |
| 3,322,461 | 5/1967 | Goldman et al. | 297/379 |
| 3,410,600 | 11/1968 | Thorpe | 297/379 X |
| 4,358,155 | 11/1982 | Osterhold et al. | 297/379 |
| 4,707,010 | 11/1987 | Croft | 297/379 |
| 4,838,513 | 6/1989 | Kondo | 297/379 X |

FOREIGN PATENT DOCUMENTS 051095 5/1982 European Pat. Off.

Primary Examiner—Laurie K. Cranmer
Attorney, Agent, or Firm—Foley & Lardner

[57] ABSTRACT

Disclosed is a vehicular seat which comprises a seat cushion; a seatback; a base plate having one end pivotally connected to the seat cushion through a pivot pin; a reclining device mounted on the base plate, the reclining device having a pivotal arm secured to the seatback; a striker secured to the seat cushion; a latch member pivotally connected to the base plate, the latch member being latchingly engageable with the striker; a cancelling structure for cancelling the latching engagement between the latch member and the striker; and a stopper structure secured to the seat cushion, the stopper structure having thereon an elastomeric member against which a lower edge portion of the base plate is pressed when the latch member is brought into a latching engagement with the striker.

7 Claims, 2 Drawing Sheets

VEHICULAR SEAT WITH SEATBACK INCLINING MECHANISM

BACKGROUND OF THE INVENTION

1. Field of the Invention

The present invention relates in general to vehicular seats, and more particularly, to vehicular seats of a type which has a so-called "seatback inclining mechanism" by which the seatback is largely inclined forward to facilitate ingress and egress of a rear seat passenger of a motor vehicle.

2. Description of the Prior Art

In order to clarify the task of the present invention, one of conventional vehicular seats of the above-mentioned type will be described with reference to FIGS. 3 and 4 of the accompanying drawings.

As is seen from FIG. 3, the seat 1 shown has a reclining device 5 mounted thereto. The reclining device 5 includes a base plate 6 connected to one side portion of a seat cushion 2, and a pivotal arm 7 pivotally connected to the base plate 6. The pivotal arm 7 is secured to a side portion of a seatback 3. A known latch mechanism is in association with the pivotal arm 7 to latch the arm 7 at a desired angular position relative to the base plate 6.

The seat 1 has further a so-called "seatback inclining mechanism" which can largely incline the seatback 3 forward. Thus, such seat 1 is very convenient when used as a front seat (viz., driver's seat or assistant driver's seat) of a two-door type motor vehicle. In fact, the seatback 3 is inclined forward when a rear seat passenger intends to get on or off the vehicle.

As is best shown in FIG. 4, the seatback inclining mechanism comprises a pivot pin 8 through which the base plate 6 is pivotally connected to the seat cushion 2. A generally C-shaped latch member 12 is pivotally connected at its one end to a middle portion of the base plate 6 through a pivot pin 18. A striker 11 is secured to the side portion of the seat cushion 2, to which the other end of the latch member 12 is latchingly engageable, as shown. A spring (not shown) is arranged between the pivot pin 18 and the latch member 12 to bias the latch member 12 in a direction to achieve the engagement with the striker 11. A wire 14 extends from the latch member 12 upward to a cancel lever 16 which is provided at an upper portion of the seatback 3.

Usually, with an aid of the biasing force of the spring, the latch member 12 is latchingly engaged with the striker 11 thereby to latch the base plate 6 to the seat cushion 2. Thus, under this condition, the pivotal arm 7 of the reclining device 5 is only permitted to pivot relative to the latched base plate 6 for inclination of the seatback 3.

When the cancel lever 16 is manipulated to pull up the wire 14, the latch member 12 is disengaged from the striker 11. Thus, under this condition, the seatback 3 can be largely inclined forward together with the base plate 6 about the pivot pin 8.

However, due to the inherent construction of the seatback inclining mechanism, the conventional seat 1 has the following drawback.

That is, during cruising of the vehicle, the seat 1 tends to produce uncomfortable noises particularly at the portion where the latch member 12 and the striker 11 are engaged. In fact, during movement of the vehicle, the load applied to the seatback 3 by a seat occupant changes successively, which causes an inevitable play of the latch member 12 relative to the striker 11.

SUMMARY OF THE INVENTION

It is therefore an object of the present invention to provide a vehicular seat of a type having a seatback inclining mechanism, which is free of the above-mentioned drawback.

According to the present invention, there is provided a vehicular seat which comprises a seat cushion; a seatback; a base plate having one end pivotally connected to the seat cushion through a pivot pin; a reclining device mounted on the base plate, the reclining device having a pivotal arm secured to the seatback; a striker secured to the seat cushion; a latch member pivotally connected to the base plate, the latch member being latchingly engageable with the striker; cancelling means for cancelling the latching engagement between the latch member and the striker; and a stopper structure secured to the seat cushion, the stopper structure having thereon an elastomeric member against which a lower edge portion of the base plate is pressed when the latch member is brought into a latching engagement with the striker.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
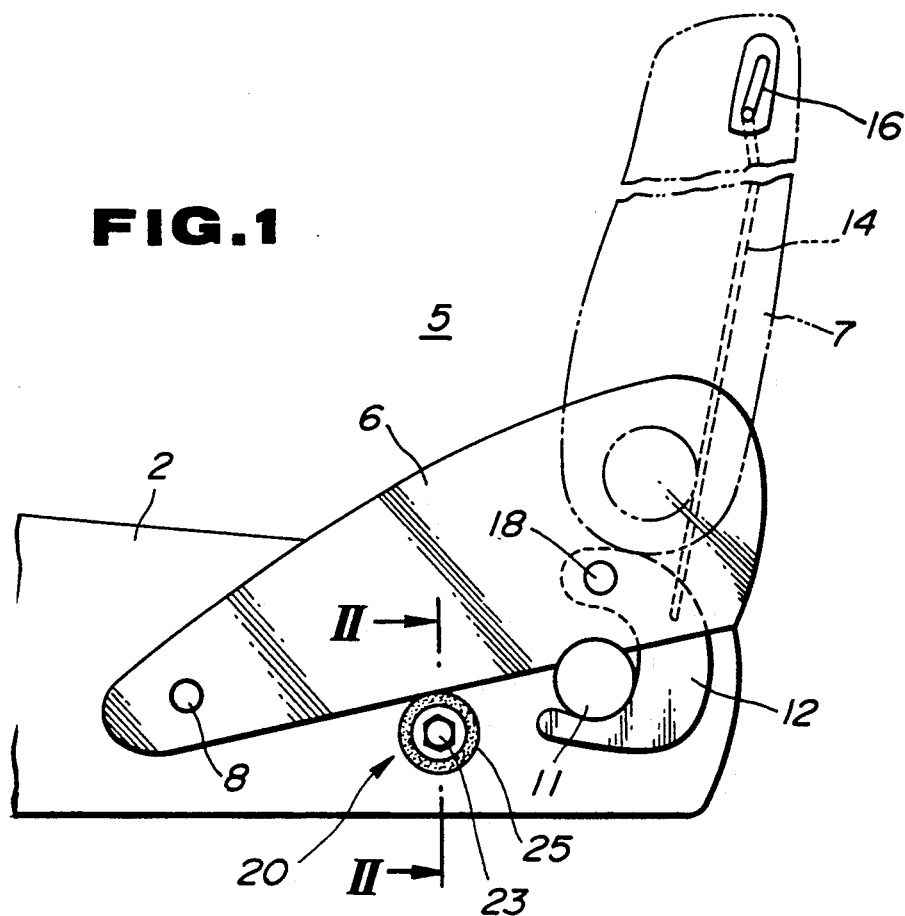
FIG. 1 is a side, but partial, view of a vehicular seat of the present invention, showing a seatback inclining mechanism.
Figure 2:
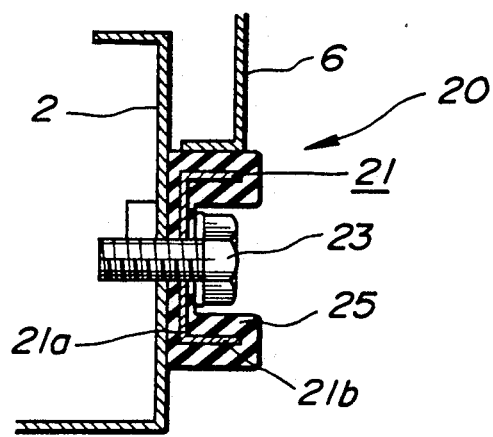
FIG. 2 is an enlarged sectional view taken along the line II—II of FIG. 1.
Figure 3:
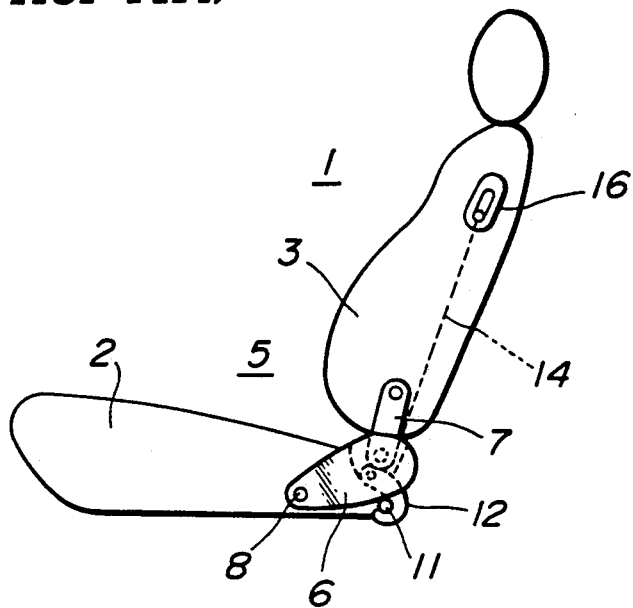
FIG. 3 is a side view of a conventional vehicular seat which has a seatback inclining mechanism mounted thereto.
Figure 4:
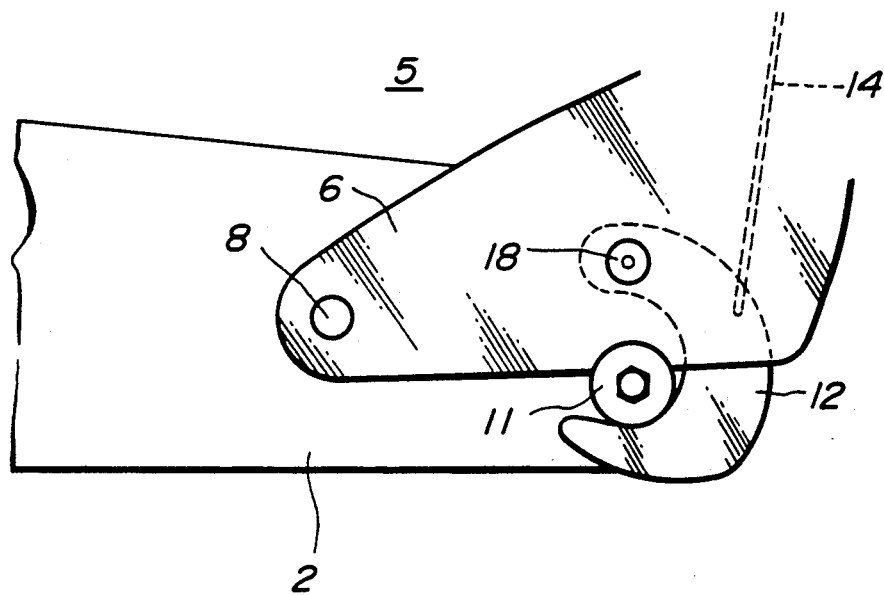
FIG. 4 enlarged side, but partial, view of the conventional seat, showing the seatback inclining mechanism.

Referring to FIGS. 1 and 2, there is partially shown but partially a vehicular seat according to the present invention. Parts substantially the same as those of the above-mentioned conventional seat are denoted by the same numerals and a detailed explanation of them will be omitted from the following description.

As is seen from FIG. 1, in accordance with the present invention, a stopper structure 20 is employed, which is secured to the side portion of the seat cushion 2 at a position between the striker 11 and the pivot pin 8.

As is understood from FIG. 2, the stopper structure 20 comprises an elastomeric circular member 25 having a center recess formed therein, a circular metal insert 21 embedded in the elastomeric circular member 25 and a connecting bolt 23 for connecting the metal insert 21 and thus the elastomeric circular member to the side frame portion 2 of the seat cushion. As shown, the circular metal insert 21 includes a bored circular base portion 21a and an annular flange 21b which are covered with the elastomeric member 25. The elastomeric member 25 may be of a rubber member, a soft plastic member or the like.

The stopper structure 20 is so arranged that when the latch member 12 is brought into latching engagement with the striker 11, a lower edge portion of the base plate 6 is pressed against the stopper structure 20, in such a manner as is shown in the drawings.

Thus, under this latched condition, the base plate 6 is tightly and unmovably clamped by both the latch member 12 and the stopper structure 20. Thus, the undesired noise generation, which would occur in the afore-mentioned conventional seat, is suppressed in the present invention.

If desired, an elastomeric member may be fixed to the lower edge portion of the base plate 6. In this case, the elastomeric member 25 on the metal insert 21 may be removed.

What is claimed is:

1. A vehicular seat comprising:
   a seat cushion;
   a seatback;
   a base plate having one end pivotally connected to said seat cushion through a pivot pin;
   a reclining device mounted on said base plate, said reclining device having a pivotal arm secured to said seatback;
   a striker secured to said seat cushion;
   a latch member pivotally connected to said base plate, said latch member being latchingly engageable with said striker;
   cancelling means for cancelling the latching engagement between said latch member and said striker; and
   a stopper structure secured to said seat cushion at a position between said striker and said pivot pin of said base plate, said stopper structure being positioned away from said striker by a given distance, said stopper structure having thereon an elastomeric member against which a lower edge portion of said base plate is pressed when said latch member is brought into a latching engagement with said striker.

2. A vehicular seat as claimed in claim 1 in which said latch member and said striker are positioned that one latching engagement is effected therebetween, said base plate is prevented from pivoting upward about said pivot pin.

3. A vehicular seat as claimed in claim 2, in which said stopper structure is so arranged that when said lower edge portion of said base plate is pressed against said elastomeric member, said base plate is prevented from pivoting downward about said pivot pin.

4. A vehicular seat as claimed in claim 3, in which said stopper structure comprises:
   a circular metal insert covered with said elastomeric member; and
   a bolt connecting said circular metal insert to said seat cushion.

5. A vehicular seat as claimed in claim 4, in which said metal insert comprises a circular base portion and an annular flange portion which are embedded in said elastomeric member, said elastomeric member being circular in shape.

6. A vehicular seat as claimed in claim 5, in which said cancelling means comprises:
   a wire having one end fixed to said latch member; and
   a cancel lever having the other end of said wire connected thereto, said cancel lever being provided at a certain portion of said seatback.

7. A vehicular seat as claimed in claim 6, in which said latch member is biased in a direction to achieve latching engagement with said striker.

* * * * *